Patented July 27, 1954

2,684,910

UNITED STATES PATENT OFFICE 2,684,910

METHOD OF PREPARATION OF MONOCRYSTALLINE STRONTIUM TITANATE COMPOSITION OF HIGH REFRACTIVE INDEX

Leon Merker, New York, N. Y., assignor to National Lead Company, New York, N. Y., a corporation of New Jersey No Drawing. Application February 2, 1953,
Serial No. 334,707

3 Claims. (Cl. 106—42)

This invention relates to monocrystalline strontium titanate and to methods of making and treating monocrystalline strontium titanate.

Monocrystalline strontium titanate is characterized by a high index of refraction (about 2.4) and a low reciprocal relative dispersion or $v$ value (about 13). Large single crystals of strontium titanate may be made which are clear, transparent and glass-like and such crystals have important optical applications because the index is substantially higher than the reciprocal relative dispersion substantially lower than those of the densest flint glasses. Whether clear or colored, the crystals have important gem stone and other applications because of their high refraction and dispersion.

One broad use of optical materials having high refractive indices and high dispersion is in the maufacture of lenses and prisms. For example, materials having a high index of refraction are utilized in the construction of optical systems such as telescopic or high magnification microscopic objectives. Furthermore combinations of optical materials which individually possess widely variant optical properties are used to prepare achromatic lenses. High dispersion qualities are also useful for making prisms and the like. Highly refractive single crystal material is also useful for the preparation of ornamental objects such as gem stones. Synthetic gems of various types and colors are in great demand for both personal adornment and industrial uses.

An object of this invention therefore is to provide a monocrystalline glass-like composition which possesses exceedingly high index of refraction with a high dispersion or relatively low $v$ value. A further object is to provide a method for producing a glass-like material suitable for manufacture of lenses, prisms, gem stones and the like. Another object is to provide a rapid process for the manufacture of monocrystalline composition which is economical and more easily operated. These and other objects will become apparent from the following more complete description of the invention.

Broadly this invention contemplates a monocrystalline mass of strontium titanate and a method for producing the same which comprises periodically introducing into an oxygen-hydrogen flame a powdered composition consisting essentially of strontium titanate and an excess of oxidic compound of strontium and crystallizing the melted material as a monocrystalline mass in the form of a boule and subsequently subjecting the boule to an oxidizing treatment at temperature from about 650° C. to about 1700° C.

It has been found that the addition of an oxidic compound of strontium to the strontium titanate feed material provides a composition from which a strontium titanate boule is grown more easily than when strontium titanate feed material containing no excess strontium oxide is employed. It has been found that strontium titanate feed material containing as low as about 0.01% excess strontium oxide is effective in aiding the formation of monocrystalline strontium titanate. Amounts as high as 20% excess strontium oxide have been successfully employed, and higher amounts may be used, but the preferred range however, lies between about 0.1% and about 1%. Employing amount greater than about 1% may be used but the results are not superior to those obtained by employing amounts which fall within the preferred range. Only a very small amount of the excess strontium oxide remains in the boule formed. Most of the strontium oxide volatilizes in the flame and is lost from the boule itself.

This application is a continuation-in-part of co-pending application Serial No. 252,906, filed October 24, 1951, now U. S. Patent No. 2,628,156, issued February 10, 1953, which describes and claims monocrystalline strontium titanate prepared without the addition of modifying or coloring agents. The process for preparation of the single crystals of strontium titanate is more fully described in co-pending application Serial No. 334,704, filed February 2, 1953, entitled "Refractive Material."

The term strontium titanate is intended to embrace both pure and substantially pure $SrTiO_3$, the latter which contains impurities or added coloring or modifying agents either present or added which are of a nature and in amount so as to not affect the monocrystalline structure nor alter the desired color of the strontium titanate material produced. In most cases the impurities are held to a minimum and ordinarily will not exceed a few tenths of a per cent and modifying or coloring agents are added in the amount necessary to produce the desired effect.

In order to prepare a monocrystalline mass by co-fusing particles of strontium titanate, it is necessary to employ high temperatures. Strontium titanate melts in the neighborhood of 2050° C. and it is therefore preferred to use an oxygen-hydrogen flame in order to obtain the necessary temperatures without the possible introduction of impurities.

It is convenient to drop the finely divided particles of the strontium titanate composition into the area of intense heat formed by the oxygen-hydrogen flame, i. e. in or near the oxygen cone. Within this area the strontium titanate composition melts and as it cools below the melting point crystallizes as a single crystal on a base which holds the molten strontium titanate material. In order to start such a single crystal to form it is desirable to first form a seed and then gradually build up the amount of molten material on the seed to form the crystal. Such a procedure allows the crystal to build up upon itself gradually increasing in diameter until a boule or carrot-shaped single crystal of strontium titanate is formed. The size of the orifices of the oxygen-hydrogen torch determines the size of the intensely heated zone which in turn, determines the diameter of the carrot-shaped crystal produced.

It is preferred to employ a strontium titanate powdered material which is substantially free from objectionable or incompatible impurities which detrimentally would affect the crystal structure and which is on composition, i. e. approximately one mole of SrO for each mole of $TiO_2$. The starting material should be finely divided and fairly uniform in size. Such a material may be conveniently prepared by first reacting titanium oxalate with strontium chloride to precipitate strontium titanium oxalate. After thoroughly washing the strontium titanium oxalate, it is heated at a temperature of at least 500° C. to remove the oxalate portion thus forming strontium titanate. Preferably this strontium titanate material is then crushed and ground to obtain finely divided material from which the strontium titanate single crystal is subsequently formed.

Substantially any oxidic compound of strontium can be added to the feed material, for example, the oxide or any oxidic compounds which form the oxide at the temperatures employed in the preparation of the strontium titanate boule. According to the present invention a small amount of an oxidic compound of strontium, for example, the oxide may be mixed with the strontium titanate starting material in any convenient manner, for instance, by dry mixing. A more uniform mixture and therefore a preferred mixture may be prepared by adding compounds of the addition agent as a powder, slurry, or solution, to the strontium titanate oxalate prior to the heat treatment to remove the oxalate portion. The color of the boule either before or after the subsequent oxidation treatment is not affected by the addition of the excess strontium oxide. This however could be expected since strontium oxide itself is white in color and since most of the strontium oxide is volatilized in the flame, and therefore is not present in the boule formed.

When employing quantities of strontium oxide in the feed material according to the instant invention, the boule is more easily formed and it can be more rapidly grown. If it is formed without the addition of the excess strontium oxide it has been found that a portion of the strontium oxide in the strontium titanate tends to volatilize and therefore the slight deficiency of strontium oxide in the melted material tends to make a strontium oxide defect structure in the strontium titanate boule formed.

A series of boules were prepared in the following manner. The feed materials consisted of a mixture of strontium titanate and various quantities of the strontium oxide. These feed materials were progressively fused by passing the powdered material through the flame. The fusions were carried out at temperatures between 2080° C. and 2150° C. The boules were grown on a pedestal as the fused material was progressively crystallized. As produced, the boules were substantially black in color. They were substantially carrot-shaped and had a more or less frosted outer surface. When split, the interior surface of the pieces is vitreous and shiny. These boules were subsequently subjected to an oxidizing treatment, in either whole or split form at temperatures from 650° C. to 1700° C. for 12 to 180 hours. These oxidized crystals were then cut and polished to form beautiful substantially white gems, optical bodies such as lenses, prisms, and the like.

From the above description a monocrystalline glass-like composition which possesses exceedingly high index of refraction with a high dispersion has been prepared. Such material is suitable for the manufacture of lenses, prisms, gem stones and the like. By use of the instant invention a rapid process for the manufacture of monocrystalline composition is provided which is economical and easy to operate. The strontium titanate crystal produced by the instant invention does not have a strontium oxide defect structure and therefore is more easily grown.

While this invention has been described and illustrated by the example shown, it is not intended to be limited thereto, and other modifications may be employed within the scope of the following claims.

I claim:

1. Method for the preparation of a monocrystalline mass of strontium titanate which comprises periodically introducing into an oxygen-hydrogen flame a powdered composition consisting essentially of strontium titanate and from about 0.01% to about 20% by weight of an excess of an oxidic compound of strontium and crystallizing the melted material as a monocrystalline mass in the form a boule.

2. Method for the preparation of a monocrystalline mass of strontium titanate which comprises periodically introducing into an oxygen-hydrogen flame a powdered composition consisting essentially of strontium titanate and from about 0.01% to about 20% by weight of an excess of strontium oxide, crystallizing the melted material as a monocrystalline mass in the form of a boule and subsequently subjecting the boule to an oxidizing atmosphere at temperature from about 650° C. to about 1700° C.

3. Method for the preparation of a monocrystalline mass of strontium titanate which comprises periodically introducing into an oxygen-hydrogen flame a powdered composition consisting essentially of strontium titanate and from about 0.1% to about 1.0% by weight of an excess of an oxidic compound of strontium and crystallizing the melted material as a monocrystalline mass in the form of a boule.

No references cited.